United States Patent
Malone

(10) Patent No.: US 6,778,585 B2
(45) Date of Patent: Aug. 17, 2004

(54) VCSEL MONITORING USING REFRACTED RAY COUPLING

(75) Inventor: Kevin Malone, Boulder, CO (US)

(73) Assignee: Optical Communication Products, Inc., Woodland Hills, CA (US)

( * ) Notice: Subject to any disclaimer, the term of this patent is extended or adjusted under 35 U.S.C. 154(b) by 0 days.

(21) Appl. No.: 09/967,638

(22) Filed: Sep. 28, 2001

(65) Prior Publication Data

US 2002/0048293 A1 Apr. 25, 2002

Related U.S. Application Data

(60) Provisional application No. 60/237,332, filed on Oct. 2, 2000.

(51) Int. Cl.[7] .............................. H01S 3/08; H01S 5/00
(52) U.S. Cl. ......................................... 372/108; 372/50
(58) Field of Search .............................. 372/50, 108, 6, 372/29.01, 38.01; 385/31, 33, 38, 28, 54, 60, 72, 88

(56) References Cited

U.S. PATENT DOCUMENTS

| | | | | |
|---|---|---|---|---|
| 4,531,959 A | * | 7/1985 | Kar et al. ...................... 65/3.11 |
| 4,659,216 A | * | 4/1987 | Allos et al. ................. 356/73.1 |
| 4,880,290 A | * | 11/1989 | Kumazawa et al. ....... 350/96.2 |
| 5,108,167 A | * | 4/1992 | Kandpal et al. .............. 385/33 |
| 5,490,227 A | * | 2/1996 | Tanabe et al. ................ 385/29 |
| 5,557,693 A | | 9/1996 | Stevens et al. |
| 5,642,448 A | | 6/1997 | Pan et al. |
| 5,668,902 A | * | 9/1997 | Kurata ......................... 385/38 |
| 5,724,464 A | | 3/1998 | Kozuka |
| 5,799,030 A | * | 8/1998 | Brenner ....................... 372/50 |
| 5,812,581 A | * | 9/1998 | Cox ............................. 372/50 |
| 5,845,030 A | * | 12/1998 | Sasaki et al. ................. 385/88 |
| 5,867,622 A | * | 2/1999 | Miyasaka et al. ............ 385/88 |
| 6,001,664 A | * | 12/1999 | Swirhun et al. ............. 438/31 |
| 6,078,601 A | * | 6/2000 | Smith ......................... 372/38 |
| 6,160,834 A | * | 12/2000 | Scott ........................... 372/96 |
| 6,243,508 B1 | * | 6/2001 | Jewell et al. ................. 385/14 |
| 6,328,482 B1 | * | 12/2001 | Jian ............................. 385/88 |
| 6,347,178 B1 | * | 2/2002 | Edwards et al. ............ 385/147 |
| 6,419,405 B1 | * | 7/2002 | Boscha ........................ 385/93 |
| 6,435,734 B2 | * | 8/2002 | Okada et al. ................. 385/88 |
| 6,488,414 B1 | * | 12/2002 | Dawes et al. ................. 385/79 |

* cited by examiner

Primary Examiner—Hoang V. Nguyen
Assistant Examiner—Phillip Nguyen
(74) Attorney, Agent, or Firm—Barlow, Josephs & Holmes, Ltd.

(57) ABSTRACT

A method and apparatus for monitoring the optical power output of a VCSEL uses refracted ray coupling to direct rays refracted out of an optical transmission medium, towards a photodetector. The photodetector is coupled to feedback circuitry and laser control circuitry capable of adjusting the VCSEL based on the monitored power output. A portion of the rays that enter the optical fiber are refracted out of the optical fiber by means of high-index materials and directed toward the photodetector by reflective surfaces situated around the coupling region in which the VCSEL is coupled to the optical fiber.

17 Claims, 4 Drawing Sheets

VCSEL MONITORING USING REFRACTED RAY COUPLING

CROSS REFERENCE TO RELATED APPLICATION

This application claims priority of U.S. Provisional Application Serial No. 60/237,332, entitled VCSEL MONITORING USING REFRACTED RAY COUPLING, filed Oct. 2, 2000, the contents of which are herein incorporated by reference.

FIELD OF THE INVENTION

The present invention relates most generally to vertical cavity surface emitting lasers (VCSELs). More particularly, the present invention is directed to an apparatus and method that utilize refracted ray coupling principles to monitor the optical output of a VCSEL.

BACKGROUND OF THE INVENTION

VCSELs have become preferred in today's optoelectronics industry because they are efficient, small in size, readily assembled into arrays, and easy to manufacture. Furthermore, VCSELs are exceptionally reliable due to good VCSEL-to-VCSEL uniformity, and they require less power to drive their lasing action. Within optical communication systems utilizing VCSELs, it is important to control the optical data signal being transmitted. Because VCSELs which are commonly used in today's optoelectronics industry, emit a unidirectional light beam normal to the surface in which they are formed, it is especially difficult to monitor the output optical power of the VCSEL which provides the data signal without attenuating or otherwise compromising the integrity of the light emitted. Logically, in order to control the output optical power of a VCSEL and to maintain the optical power at a desired level, the output optical power must first be monitored. Based on the monitored output optical power, adjustments can be made to the current signals supplied to the VCSEL to control the output optical power of the VCSEL which provides the data signal.

Refracted ray coupling techniques, also known as "Refracted Near Field" techniques, are used in the field of optoelectronics to characterize optical fibers, for example. Such a technique is discussed in "Optical Fiber Index Profiles by the Refracted-Ray Method (Refracted Near-Field Scanning)", Appl. Opt. 20(19), 3415–3421, Oct. 1981, the contents of which are herein incorporated by reference. Optical fibers typically include a core glass section, surrounded by a cladding layer which has a refractive index which is lower than the refractive index of the core layer. When an optical source, such as a VCSEL or other laser, is coupled to an optical fiber, some, and preferably most, of the light is propagated as guided rays in the core of the optical fiber. Light which is not guided along the core escapes into the surrounding cladding layer and is propagated along the cladding layer as cladding rays. Cladding rays quickly become attenuated. According to refracted ray coupling techniques, the cladding layer of the optical fiber is coated with a material such as a laser liquid or a UV-cured liquid, which has a greater refractive index than the cladding layer. According to this technique, some of the cladding mode light exits the cladding layer and therefore the optical fiber, through the coating. The coating essentially draws the rays out of the cladding layer. The angle and power of the light refracted out of the optical fiber is measured and, using Snell's law, the relative indices of refraction of the core layer and the cladding layers can be determined. Such characterization is commonly performed upon an optical fiber prior to it being installed in the field.

Because of the exhibited need to monitor and control the optical output of a VCSEL, it would be useful to utilize the portion of emitted light from a VCSEL, that exits the optical fiber in accordance with refracted ray coupling principles to provide such monitoring.

SUMMARY OF THE INVENTION

The present invention provides an apparatus and method for causing a portion of light emitted by a laser to be refracted out of the optical fiber to which the laser is coupled, and for using the refracted light to monitor the laser. The refracted light exits the optical fiber through a coating formed around the cladding layer which, in turn, surrounds the core of the optical fiber. The light which is refracted out of the optical fiber is directed onto a photodetector that detects the refracted rays representing a portion of the light emitted from the laser.

BRIEF DESCRIPTION OF THE DRAWINGS

The present invention is best understood from the following detailed description when read in conjunction with the accompanying drawings. It is emphasized that, according to common practice, the various features of the drawing are not to-scale. On the contrary, the dimensions of the various features are arbitrarily expanded or reduced for clarity. Included in the drawings are the following figures.

Like numerals denote like features throughout the specification and drawing.

DETAILED DESCRIPTION OF THE INVENTION

Figure 1:
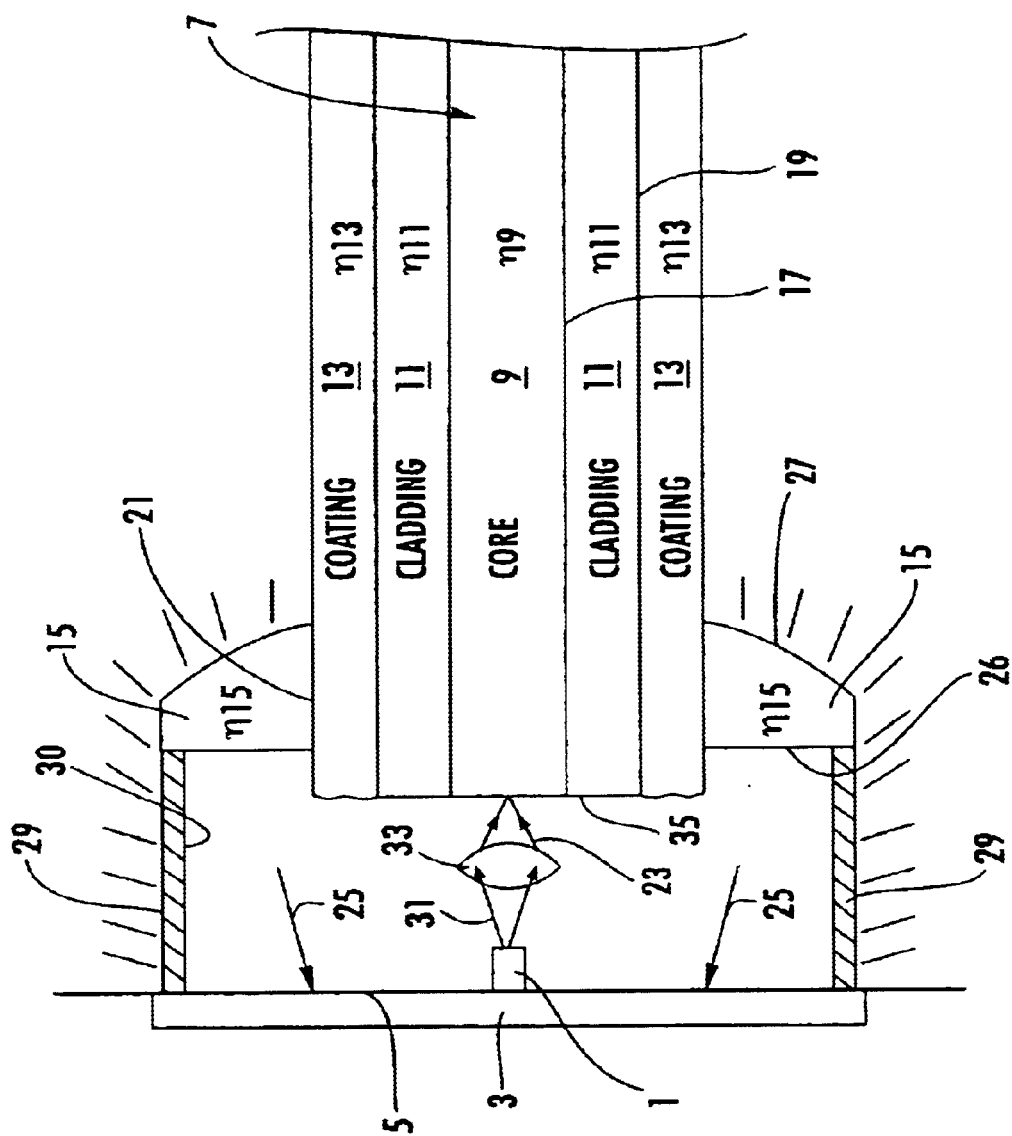
FIG. 1 is a cross-sectional view showing a first exemplary embodiment of an apparatus of the present invention.

According to each of the following exemplary embodiments, a photodetector such as a photodiode is used to absorb a portion of the light emitted from a laser such as a vertical cavity surface emitting laser (VCSEL). Conventional photodiodes and other photodetectors such as PIN (P-type material/intrinsic layer/N-type material) photodiodes may be used. The photodetector is chosen in conjunction with the wavelength of light to be detected. As will be shown, the photodetector is arranged to detect a portion of the emitted light, by absorbing it on an absorbing surface. Other photodetectors which sense light in other manners and which include detecting surfaces other than absorbing surfaces, may be used alternatively. Hereinafter, photodiodes and other photodetectors will be collectively referred to as photodetectors, and the detecting surface will be referred to as the absorbing surface.

According to each of the following exemplary embodiments, VCSELs that emit light at any of various wavelengths may be used as the source of emitted light and may therefore be monitored according to the present invention. Long wavelength (>1200 nm) and short wavelength VCSELS may be used. Front surface and rear surface emitting VCSELs may be used. Furthermore, other lasers, such as edge-emitting lasers, may alternatively be used as the source of emitted light according to the present invention. Hereinafter, the source of emitted light will be referred to as a VCSEL, although it should be understood that other light sources such as edge-emitting lasers may be used alternatively.

The VCSEL emits light, which is the data signal that propagates along the optical fiber to which the VCSEL is coupled. According to each exemplary embodiment, the portion of emitted light absorbed in the photodetector is known to represent an approximate percentage of the total amount of light emitted by the VCSEL. This determination may be made using various means, including experimental means. In this manner, the actual optical power emitted from the VCSEL can be approximated using the light detected by the photodetector. Furthermore, when the intensity of light monitored by the photodetector changes, the total amount of light emitted by the VCSEL is then known to have changed accordingly. In response to the detected change in power of the light emitted from the VCSEL, various conventional electrical circuits, laser control means and feedback techniques are known and may be used to adjust the input current fed to the VCSEL in order to adjust the optical power level of the light emitted from the VCSEL and to maintain the power of emitted light at a desired level.

According to an exemplary embodiment, the photodetector is coupled to the feedback and control electrical circuitry. The photodetector, together with this electrical circuitry, may develop an electrical signal based on, and representative of, the amount of light absorbed by the absorbing surface, also known as the light intensity at the photodetector surface. The electrical signal strength advantageously varies as does the light absorbed by the photodetector. The electrical circuitry may be coupled to various laser control means which may adjust the laser output based on the detected light and the produced electrical signal. In an exemplary embodiment, the laser controls may include a computer. The light monitoring elements of the present invention are chosen so that the light detected by the photodetector and the electrical signal produced therefrom, increase monotonically as does the light output of the VCSEL. In one exemplary embodiment, the electrical signal strength varies linearly with detected light.

According to each of the following exemplary embodiments, the VCSEL/optical fiber arrangement is preferably coupled such that the majority of light emitted by the VCSEL is coupled onto the optical fiber, specifically the core of the optical fiber. In an exemplary embodiment, at least ninety percent of the light emitted by the VCSEL is directed to the core of the optical fiber along which it propagates, but other percentages of emitted light may reach the optical fiber according to other exemplary embodiments. The light that does not propagate within the optical fiber, is the subject of the present invention and is monitored to provide information on the overall power of the light emitted by the VCSEL. There is preferably sufficient light coupled into the optical fiber to maintain adequate data transmission and sufficient light impinging on the photodetector to provide an adequate feedback signal for control of the VCSEL output power.

FIG. 1 is a cross-sectional view showing an exemplary embodiment of the apparatus of the present invention. FIG. 1 shows VCSEL 1 coupled to an optical fiber. According to other exemplary embodiments, other optical transmission media may be used alternatively. Optical fiber 7 includes core 9 surrounded by cladding layer 11. Optical fiber 7 is a conventional optical fiber, including conventional cladding layer 11 surrounding conventional core 9, each formed according to conventional methods. Core 9 may be formed of glass or similar materials. It should be noted that refractive index $n_9$ of core layer 9, is typically greater than refractive index $n_{11}$ of cladding layer 11. Outer surface 19 of cladding layer 11, and therefore the circumferential surface of the optical fiber, is coated with coating 13. Coating 13 may be a commercially available laser liquid or other UV-cured epoxies or UV-cured liquids having relatively high refractive indices. As such, refractive index $n_{13}$ of coating 13 is preferably greater than refractive index $n_{11}$ of cladding layer 11. Circumferentially surrounding a portion of the coated optical fiber near butt end 35, is outer material 15 which preferably has a refractive index $n_{15}$ greater than refractive index $n_{13}$. As such, outer material 15 may alternatively be referred to as high-index material 15. According to an exemplary embodiment, outer material 15 may be glass such as flint glass or crown glass. Outer material is chosen to be transparent to light at the wavelength of operation, and may alternatively be formed of crystal or plastic. Outer material 15 may form part of a transparent ferrule conterminously surrounding at least a segment of optical fiber 7. Outer material 15 may be formed by various conventional machining techniques and may be shaped and sized to centrally receive the coated optical fiber therein, but other configurations may be used according to other exemplary embodiments. Outer material 15 includes inner surface 26, which is closer to VCSEL 1 and outer surface 27 which is further from VCSEL 1. Outer surface 27 of outer material 15 is a reflective surface which retains light within outer material 15, precludes loss of light through reflective outer surface 27 and directs light toward photodetector 3. Outer surface 27 may be coated or polished to produce a reflective surface. Integrating member 29 surrounds the coupling region and may be a metal sleeve according to an exemplary embodiment. Integrating member 29 may take on various other shapes in surrounding the region in which VCSEL 1 is coupled to optical fiber 7, and is arranged to reflect refracted and/or reflected rays towards photodetector 3. Integrating member 29 is generally positioned between VCSEL 1 and optical fiber 7 in the exemplary embodiment. Integrating member 29 includes reflective inner surface 30, which may be a highly polished surface or a surface coated with a reflective metal such as gold. Integrating member 29 may take on various other configurations and may include various other inner reflective surfaces. According to an exemplary embodiment (not shown), integrating member 29 may conterminously surround reflective outer surface 27 of outer material 15. According to yet another exemplary embodiment, integrating member 29 may not be used.

VCSEL 1 is coupled to optical fiber 7. Lens 33 is used to focus emitted light 31 from VCSEL 1 onto optical fiber 7, desirably along core 9 of optical fiber 7. Lens 33 produces focused light 23. A conventional unidirectional emitting VCSEL 1 and conventional lens 33 may be used. Other sources of emitted light may be used alternatively. Various mechanical support means may be used to position and secure VCSEL 1, lens 33, and optical fiber 7 into their relative configuration. Redirected light 25, which will be discussed in conjunction with FIG. 3, impinges upon absorbing surface 5 of photodetector 3. Photodetector 3 may be a conventional photodiode or other photodetector, such as is commercially available in the art. Photodetector 3 is arranged to absorb and detect redirected light 25. Although shown beneath the VCSEL in the exemplary embodiment, one or more photodetectors may be arranged in various other locations within integrating member 29. One or more photodetectors, for example, may be placed adjacent to the VCSEL, on the internal walls of integrating member 29, perpendicular to VCSEL 1, or elsewhere, for absorbing a suitable amount of light for monitoring.

Figure 2:
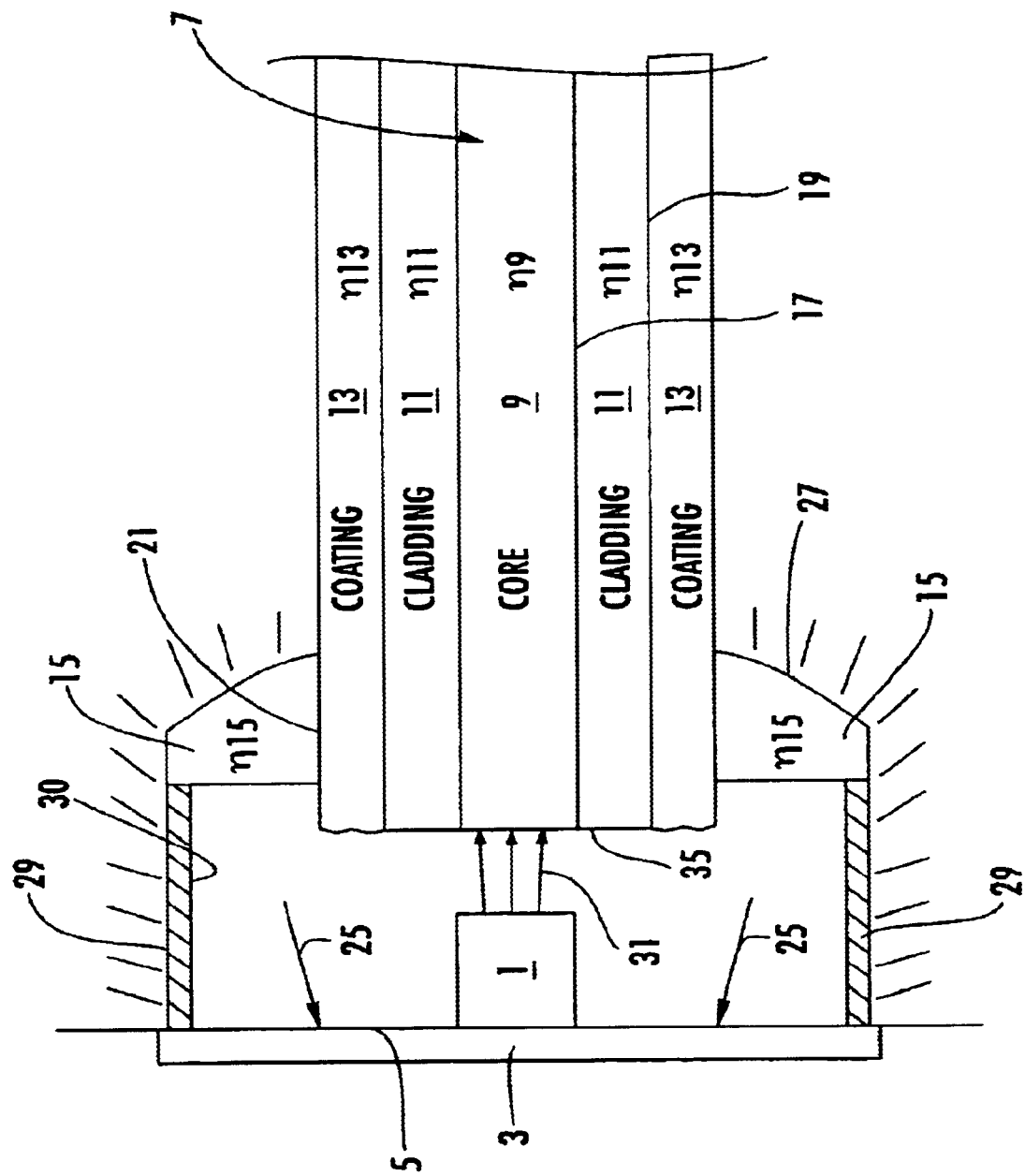
FIG. 2 is a cross-sectional view showing a second exemplary embodiment of an apparatus according to the present invention.

Now turning to FIG. 2, a second exemplary embodiment is shown. In FIG. 2, VCSEL 1 is directly or butt-coupled to optical fiber 7. In this manner, emitted light 31 is coupled directly to optical fiber 7 without a lens, such as lens 33 shown in FIG. 1. Conventional techniques for mechanically butt-coupling a VCSEL to an optical fiber are available and may be used. The exemplary embodiment shown in FIG. 2 is used to illustrate that the emitted light may be coupled to the optical fiber in various ways.

Figure 3:
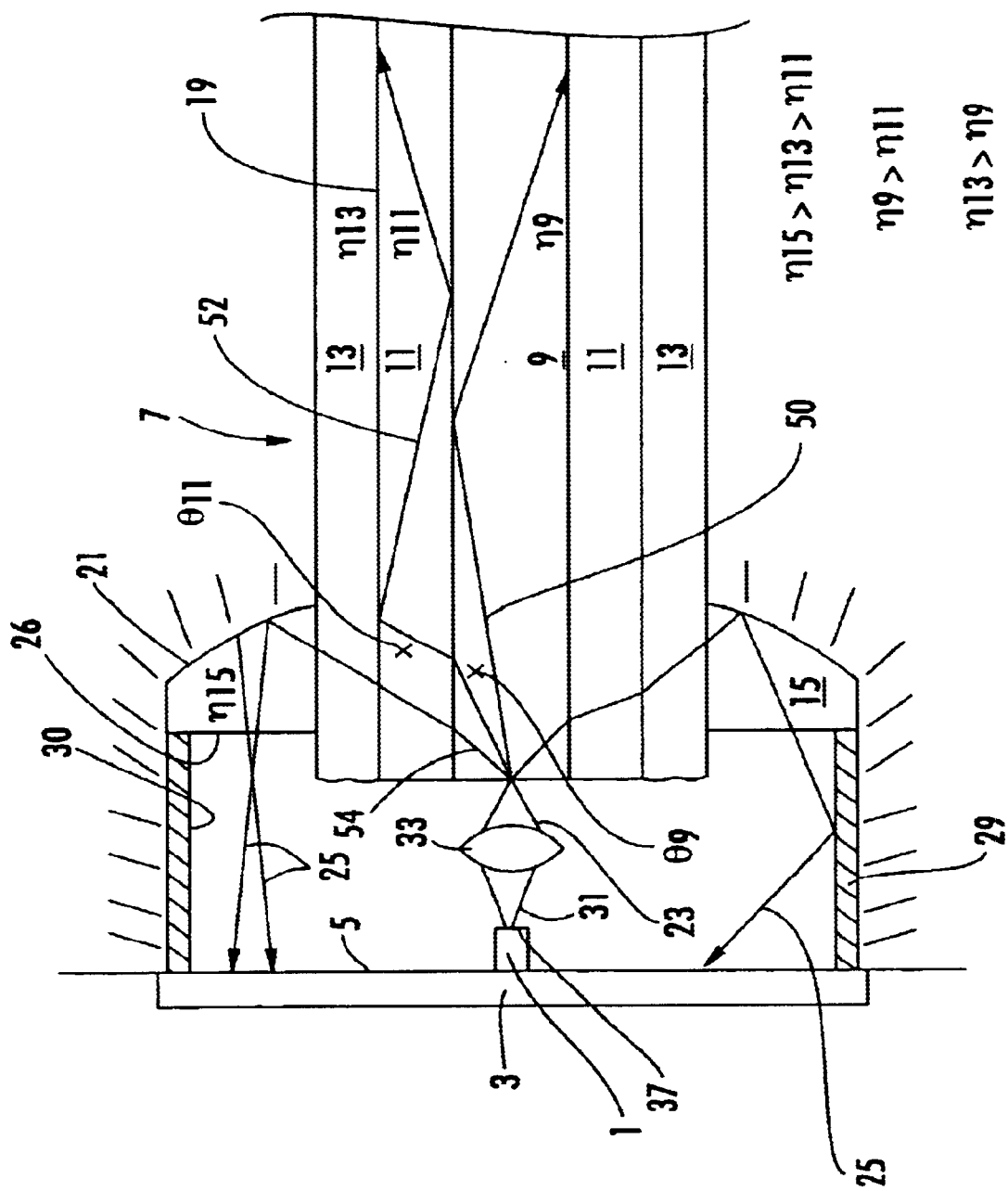
FIG. 3 is a cross-sectional view of an exemplary apparatus of the present invention showing the refracted light beams.

FIG. 3 is a cross-sectional view which shows the details of the optical mechanics which afford some of the emitted light to be detected by photodetector 3. VCSEL 1 emits emitted light 31, which is focused by lens 33 as focused light 23, which is coupled to core 9 of optical fiber 7. Various conventional means may be used to power VCSEL 1 and cause it to emit emitted light 31. In an exemplary embodiment, VCSEL 1 may be electrically coupled to laser control means which may further be coupled to photodetector 3 by additional electrical circuitry.

Light rays enter core 9 of optical fiber 7 at various angles. Some and preferably most of the rays, such as ray 50, are propagated inside core 9 of optical fiber 7 and are referred to as guided rays which communicate the optical information. Rays that have a higher angle than the guided rays, with respect to the axis of optical fiber 7, may escape core 9 and enter cladding layer 11 along which they are propagated. Such rays are known as cladding rays or cladding modes. Cladding rays typically become quickly attenuated. Ray 52 is an example of a cladding ray. The angle of refraction, or the angle which the light bends in traveling from one medium to another, is determined according to Snell's law. According to Snell's law, the following relationship holds true: $n_{11}\sin\theta_{11} = n_9\sin\theta_9$. It can be seen that ray 52 bends as it travels from core 9 to cladding layer 11 of optical fiber 7 since angle $\theta_9$ is not equal to angle $\theta_{11}$. The relative refractive indices of the materials are shown in FIG. 3. Additional rays of emitted light (not shown) may travel directly from VCSEL 1 to cladding layer 11.

Coating 13 includes refractive index $n_{13}$, which is greater than refractive index $n_{11}$ of cladding layer 11. Because of this relationship, some of the rays which enter core layer 9, such as ray 54 which enters cladding layer 11 at a greater angle than that of ray 52 with respect to the axis of optical fiber 7, will be drawn or refracted out of cladding layer 11. Rays that enter optical fiber 7 at an angle greater than the critical angle, with respect to the axis of optical fiber 7, are refracted out of cladding layer 11, such as ray 54. Snell's law also applies to the bending of ray 54 as it travels between the other various layers. In this manner, then, not all of the rays which enter cladding layer 11 are propagated as cladding rays. Some rays, such as ray 54, are refracted out of cladding layer 11 of optical fiber 7 and enter coating 13. A portion of these rays enter outer material 15. Outer material 15 has a refractive index $n_{15}$ being greater than refractive index $n_{13}$ of coating 13. Exiting light that escapes coating 13 may therefore be drawn into outer material 15, reflected by outer surface 27, and redirected as redirected light 25 onto absorbing surface 5 of photodetector 3. Outer surface 27 is a polished or reflective surface which reflects the rays which enter outer material 15, back within the coupling region as redirected light 25 which is directed onto absorbing surface 5 of photodetector 3. In the exemplary embodiment shown, absorbing surface 5 of photodetector 3 is parallel to emitting surface 37 of VCSEL 1, but other arrangements may be used according to other exemplary embodiments. Emitting surface 37 is also known as the VCSEL surface or the surface of the substrate on which the VCSEL is formed. Integrating member 29, including reflective inner surface 30, aids in directing some of the refracted and reflected light, as redirected light 25 onto absorbing surface 5 of photodetector 3.

According to the method of the present invention, the light coupling efficiency between the VCSEL and the optical fiber is not compromised. The light that enters optical fiber 7 and is guided along core 9 to provide an optical signal, is preferably not compromised by the present invention. Rather, the present invention utilizes the light that escapes core 9 and might otherwise be quickly attenuated as cladding rays, to monitor the optical output of the VCSEL.

The present invention also provides a method for monitoring and controlling the output power of a VCSEL. Using either of the exemplary arrangements described herein, power is applied to a VCSEL to power the VCSEL and cause it to emit light. Various conventional laser control circuitry may be used to power the VCSEL according to various exemplary embodiments. Much of the emitted light is propagated along the core of the optical fiber. A portion of the emitted light is directed onto the absorbing surface of the photodetector as described above. The percentage of emitted light which reaches the photodetector may be determined experimentally or by other means. The photodetector, together with the electrical circuitry to which it is coupled, develops an electrical signal which has a signal strength which varies with the amount of light directed to the photodetector and absorbed by the absorbing surface thereof. The electrical signal is provided to laser control means which control and may vary the optical power of the VCSEL. The laser control means may include a computer. In this manner, the optical power may be adjusted based on the detected power and controlled at a desired level.

Figure 4:
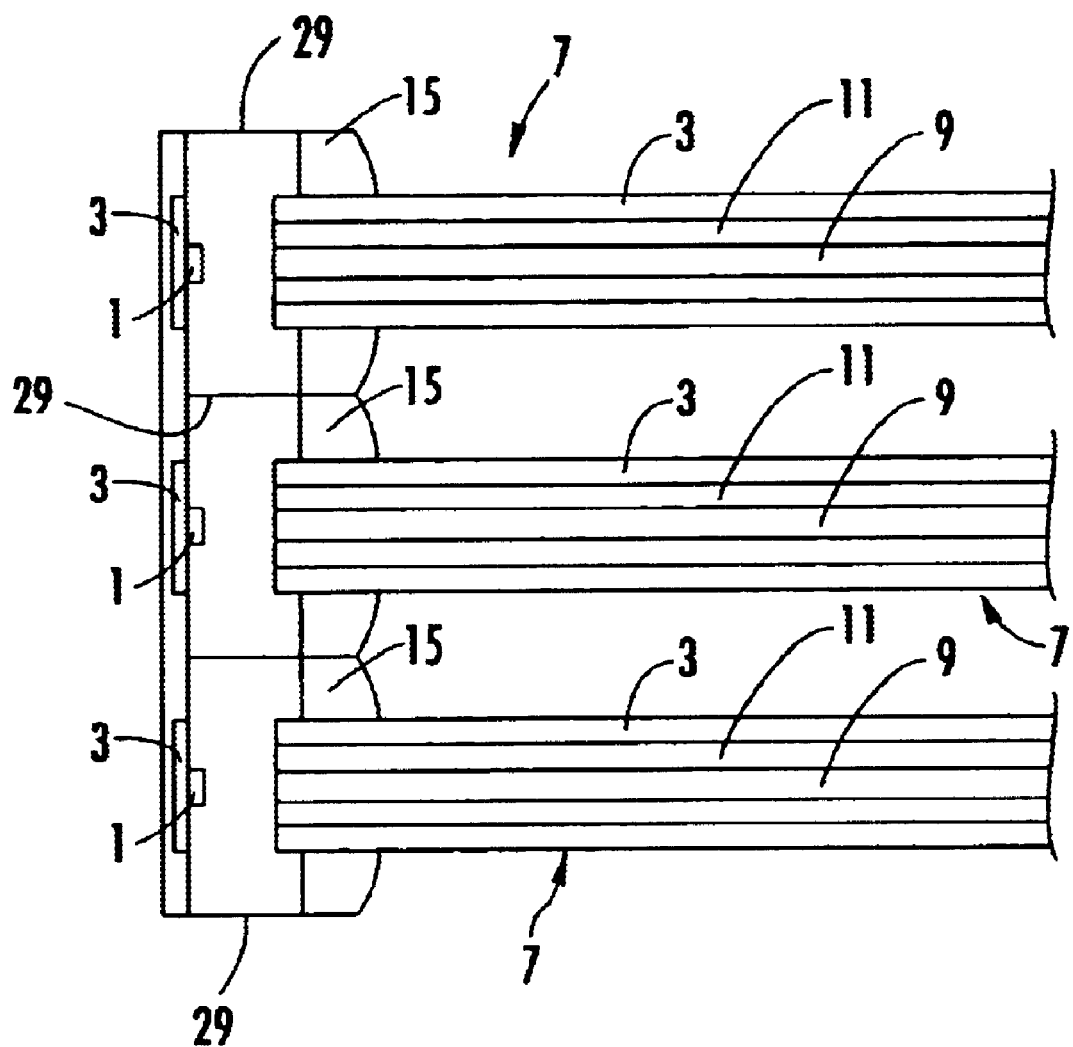
FIG. 4 is a cross-sectional view of an array of VCSELs and associated refracted ray coupling apparatuses according to the present invention.

The apparatus and method of the present invention may also be used to monitor one or all of VCSELs arranged in an array. FIG. 4 shows such an exemplary array. Although an exemplary array of three VCSELs in a linear array is shown, the apparatus and method of the present invention may similarly be applied to VCSELs arranged in arrays of various other configurations. FIG. 4 shows that each VCSEL 1 is coupled to a corresponding optical fiber 7 such that light not propagated along core 9, is directed by outer surface 27 and optional integrating member 29, to corresponding photodetector 3, to monitor the optical power of the VCSEL 1. Each of the VCSEL 1/optical fiber 7 arrangements, may be as described in the any of the various exemplary embodiments.

The preceding detailed description is intended to cover the principles of the present invention. Various other exemplary embodiments are contemplated for employing the principles of the present invention to provide for the monitoring of light emitted from VCSELs and other lasers. For example, it should be understood that, according to other exemplary embodiments, the present invention can be alternatively applied to edge emitting lasers or long wavelength VCSELs which emit light in two opposed directions. The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventor to furthering the art, and are to be construed as being without limitation to such specifically recited examples and conditions. For example, the various features shown and described in the various exemplary embodiments may be combined in other arrangements. The configuration of elements shown may also be varied. Furthermore, the relative dimensions of the components may also be varied. The scope of the present invention is best illustrated by the claims.

What is claimed is:

1. A laser module comprising:

a laser device;

a photodetector;

an optical fiber having a core and a cladding, said core having an index of refraction n1, said cladding having an index of refraction n2, wherein n1 is greater than n2;

a coating disposed on the cladding adjacent to a terminal end of said optical fiber, said coating having an index of refraction n3 wherein n3 is greater than n2;

means for coupling light from said laser device into said core of said optical fiber;

a refracted ray coupler having a coupling surface configured to engage at least a portion of an outer circumferential surface of said coating disposed on said optical fiber, and further having a surface opposite said photodetector, said refracted ray coupler comprising an optically transmissive material having an index of refraction n4, wherein n4 is greater than n3, said refracted ray coupler providing an optical path from said outer circumferential surface of said fiber to said photodetector, said indices of refraction of said core, said cladding, said coating and said coupler cooperating to return a portion of said light from said fiber back to said photodetector by moans of refracted ray coupling.

2. The laser module of claim 1 wherein said refracted ray coupler includes an outer reflective surface configured to direct said refracted portion of said light toward said photodetector.

3. The laser module of claim 1 wherein said laser comprises a vertical cavity surface emitting laser.

4. The laser module of claim 3 further comprising a lens disposed between said laser and an end face of said fiber, said lens being configured and arranged to focus light into the core of the optical fiber.

5. The laser module at claim 1 further comprising a laser control electrically coupled to said laser device and said photodetector, said photodetector generating a signal responsive to said retracted light reaching said photodetector, said laser control being operative for controlling an operational characteristic of said laser device responsive to said signal received from said photodetector.

6. The laser module of claim 2 further comprising a laser control electrically coupled to said laser device and said photodetector, said photodetector generating a signal responsive to said retracted light reaching said photodetector, said laser control being operative for controlling an operational characteristic of said laser device responsive to said signal received from said photodetector.

7. The laser module of claim 3 further comprising a laser control electrically coupled to said laser device and said photodetector, said photodetector generating a signal responsive to said refracted portion of said light reaching said photodetector, said laser control being operative for controlling an operational characteristic of said laser device responsive to said signal received from said photodetector.

8. A laser module comprising:

a housing;

a laser device mounted within said housing;

a photodetector mounted within said housing; an optical fiber having a care and a cladding, said core having an index of refraction n1, said cladding having an index of refraction n2, wherein n1 is greater than n2;

a coating disposed on the cladding adjacent to a terminal end of said optical fiber, said coating having an index of refraction n3, wherein n3 is greater than n2;

a refracted ray coupler having a coupling surface configured to engage at least a portion of an outer circumferential surface of said coating disposed on said optical fiber adjacent a terminal end of said fiber, said refracted ray coupler being further configured to engage said housing to couple said optical fiber to said housing, said refracted ray coupler comprising an optically transmissive material having an index of refraction n4, wherein n4 is greater than n3, said coupler providing an optical path from said outer circumferential surface of said fiber to an interior of said housing, said terminal end of said optical fiber being in optical alignment with said laser device such that light emitted from said laser is optically coupled into an end face of said fiber, said indices of refraction of said core, said cladding, said coating and said coupler cooperating to return a portion of said light from said fiber back to said photodetector by means of refracted ray coupling.

9. The laser module of claim 8 wherein said refracted ray coupler includes an outer reflective surface configured to direct said refracted portion of said light toward said photodetector.

10. The laser module of claim 8 wherein said housing has an inner reflective surface.

11. The laser module of claim 8 wherein said laser comprises a vertical cavity surface emitting laser.

12. The laser module of claim 11 further comprising a lens disposed between said laser and an end face of said fiber, said lens being configured and arranged to focus light into the core of the optical fiber.

13. The laser module of claim 8 further comprising a laser control electrically coupled to said laser device and said photodetector, said photodetector generating a signal responsive to said refracted light reaching said photodetector, sad laser control being operative for controlling an operational characteristic of said laser device responsive to said signal received from said photodetector.

14. The laser module of claim 9 further comprising a laser control electrically coupled to said laser device and said photodetector, said photodetector generating a signal responsive to said refracted light reaching said photodetector, said laser control being operative for controlling an operational characteristic of said laser device responsive to said signal received from said photodetector.

15. The laser module of claim 10 further comprising a laser control electrically coupled to said laser device and said photodetector, said photodetector generating a signal responsive to said refracted portion of said fight reaching said photodetector, said laser control being operative for controlling an operational characteristic of said laser device responsive to said signal received from said photodetector.

16. The laser module of claim 11 further comprising a laser control electrically coupled to said laser device and said photodetector, said photodetector generating a signal responsive to said refracted portion of said light reaching said photodetector, said laser control being operative for controlling an operational characteristic of laid laser device responsive to said signal received from said photodetector.

17. The laser module of claim 12 further comprising a laser control electrically coupled to said laser device and said photodetector, said photodetector generating a signal responsive to said refracted portion of said light reaching said photodetector, said laser control being operative for controlling an operational characteristic of said laser device responsive to said signal received from said photodetector.

\* \* \* \* \*